(12) United States Patent
Zhao et al.

(10) Patent No.: US 12,508,048 B2
(45) Date of Patent: Dec. 30, 2025

(54) WATER JET CUTTER TRAJECTORY PRESETTING APPARATUS, COMPUTER-READABLE STORAGE MEDIUM, AND ELECTRONIC DEVICE

(71) Applicant: HEALINNO (BEIJING) MEDICAL TECHNOLOGY CO., LTD., Beijing (CN)

(72) Inventors: Jing Zhao, Beijing (CN); Ce Shi, Beijing (CN); Xiaodong Li, Beijing (CN); Wenbo Chen, Beijing (CN); Yilun Shi, Beijing (CN)

(73) Assignee: HEALINNO (BEIJING) MEDICAL TECHNOLO, Beijing (CN)

( * ) Notice: Subject to any disclaimer, the term of this patent is extended or adjusted under 35 U.S.C. 154(b) by 0 days.

(21) Appl. No.: 19/224,001

(22) Filed: May 30, 2025

(65) Prior Publication Data
US 2025/0288314 A1    Sep. 18, 2025

Related U.S. Application Data

(63) Continuation of application No. PCT/CN2024/075514, filed on Feb. 2, 2024.

(51) Int. Cl.
*A61B 17/00*    (2006.01)
*A61B 8/00*    (2006.01)
(Continued)

(52) U.S. Cl.
CPC ........ *A61B 17/3203* (2013.01); *A61B 8/0841* (2013.01); *A61B 8/488* (2013.01);
(Continued)

(58) Field of Classification Search
CPC ................ A61B 17/3203; A61B 8/488; A61B 2017/00106; A61B 2017/00991
See application file for complete search history.

(56) References Cited

U.S. PATENT DOCUMENTS

| | | | | |
|---|---|---|---|---|
| 2015/0313666 | A1* | 11/2015 | Aljuri | ........... A61B 18/1485 606/41 |
| 2016/0143778 | A1* | 5/2016 | Aljuri | ........... A61B 8/10 606/107 |
| 2021/0137612 | A1* | 5/2021 | Staid | ........... A61B 17/320016 |

FOREIGN PATENT DOCUMENTS

| | | |
|---|---|---|
| CN | 113796952 A | 12/2021 |
| CN | 114376610 A | 4/2022 |

(Continued)

OTHER PUBLICATIONS

Title of the Item:202211533768.6—Notice of registration procedures Publication Date:Feb. 28, 2023 Applicant:Healinno (Beijing) Medical Technology Co., Ltd.
(Continued)

*Primary Examiner* — Amal Aly Farag

(57) ABSTRACT

The present invention discloses a water jet trajectory presetting method. The method includes following steps: setting a telescoping direction of a water jet and a telescoping direction of an ultrasonic probe in parallel; identifying a water-jetting point in a sagittal ultrasonic image, determining a first position of a cutter hole in telescoping direction; controlling ultrasonic probe to move to obtain a cross-sectional ultrasonic image of the first position; identifying the water jetting point and a direction of a water column in cross-sectional ultrasonic image, controlling water jet to rotate until water column points to ultrasonic probe, generating a water jet trajectory starting point at the position of water-jetting point on sagittal ultrasonic image; determining a second position set in the telescoping direction of water jet as a water jet trajectory end point, generating on ultrasonic image a mark line from starting point to end point. The present invention can complete obtaining of positions and postures through a biplanar ultrasound image, achieves visualization of the water jet cutter on the ultrasound image, (Continued)

provides key information for automatic planning of an excision path of the water jet cutter.

13 Claims, 11 Drawing Sheets

(51) Int. Cl.
    *A61B 8/08*           (2006.01)
    *A61B 17/3203*     (2006.01)

(52) U.S. Cl.
    CPC .............. *A61B 8/5207* (2013.01); *A61B 8/58* (2013.01); *A61B 2017/00106* (2013.01); *A61B 2017/00991* (2013.01)

(56) References Cited

FOREIGN PATENT DOCUMENTS

| | | |
|---|---|---|
| CN | 114521939 A | 5/2022 |
| WO | WO2018086135 A1 | 5/2018 |

OTHER PUBLICATIONS

Title of the Item: 202211533768.6—First office action Publication Date: Jan. 31, 2023 Applicant: Healinno (Beijing) Medical Technology Co., Ltd.

Title of the Item:202211533768.6—Notification to Grant Patent Right for Invention Publication Date: Feb. 28, 2023 Applicant:Healinno (Beijing) Medical Technology Co., Ltd.

\* cited by examiner

WATER JET CUTTER TRAJECTORY PRESETTING APPARATUS, COMPUTER-READABLE STORAGE MEDIUM, AND ELECTRONIC DEVICE

CROSS-REFERENCE TO RELATED APPLICATIONS

The present application is based on Chinese Patent Application No. 202211533768.6 filed on Dec. 2, 2022, and claims the priority thereof. The present application incorporates the entire contents of the application by reference to the application.

TECHNICAL FIELD

The present application relates to the technical field of medical devices and computers, and in particular, to a water jet cutter work trajectory presetting apparatus based on a biplanar ultrasound image.

BACKGROUND

During working of a water jet cutter, an operator needs to confirm accurate positions and postures of the water jet cutter in a lumen, including: a position of a cutter hole, a direction of the cutter hole, and a posture of the water jet cutter. A point of action of the water jet cutter is planned according to a preset working range of the water jet cutter, i.e., from a start position of a water jet cutter trajectory to an end position, and the foregoing information is drawn on an ultrasound image for the operator to confirm.

The operator holds the water jet cutter in hand or controls a support mechanism of the water jet cutter, and needs to determine initial positions and postures of the water jet cutter through biplanar ultrasounds first, including a degree of inclination of the water jet cutter, and an accurate direction and orientation of a cutter head of the water jet cutter. Through the manner of manually adjusting and rotating the support mechanism of the water jet cutter and the manner of controlling the water jet cutter to jet water, etc., the positions and postures of the water jet cutter and the direction of the cutter head of the water jet cutter are repeatedly adjusted for multiple times, and manual observation and judgment are performed until the cutter head of the water jet cutter reaches the required initial positions and postures. The process takes a long time, requires the operator to operate for multiple times, has a low degree of automation, and completely depends on manual judgment.

The positions and postures of the water jet cutter may also be determined by means of an additional position identification mark, such as optical or magnetic navigator. However, both an additional mark point and identification sensor require additional apparatuses. For example, the optical navigator needs to be mounted in a space outside the water jet cutter, there should be no occlusion between a camera and a light path of the mark point, the magnetic navigator requires an additional sensor to be added on the water jet cutter entering the body lumen and is susceptible to external magnetic field interference, and a magnetic field receiving sensor needs to be added outside a human body, such as on a hospital bed, which have an impact on an operation space of the operator, etc., especially, for example, on a surgical scenario with a small in vitro operation space.

The positions and postures of the water jet cutter may also be obtained in the ultrasound image. However, the ultrasound image has poor quality and noise disturbance is severe, such that the operator has a certain difficulty in identifying the water jet cutter in the biplanar ultrasound image, and the cutter hole of the water jet cutter cannot be recognized in the ultrasound image. In addition, the operator is further required to perform switching between biplanar ultrasound images. The cutter hole of the water jet cutter is identified by naked eyes on a sagittal plane as a start position, and an end position is selected along the water jet cutter. Since an accurate corresponding relationship between the sagittal plane and a cross section in spatial position cannot be obtained in existing ultrasounds, the operator is required to repeatedly perform switching on the sagittal plane and the cross section, and a final trajectory is preset through identification with naked eyes, spatial imagination and experience. The process takes a long time.

In view of the poor quality of the ultrasound image and large noise, if the water jet cutter is directly identified in the ultrasound image through visual inspection, the stability is poor, the water jet cutter is greatly affected by metal artifacts, and meanwhile, the cutter hole is too small to be shown in the ultrasound image. However, as for water jetting in a cavity, such as the bladder, the shape feature of a high-pressure water column is stable and obvious, there are no other images in the tissue that may generate the similar principle of the high-pressure water column, and therefore the operator manually controls water jetting to judge the position and direction of the cutter head of the water jet cutter during manual operation. However, during manual operation, due to an overly small amount of water jetting or overly short time, the operator cannot observe the phenomenon of water column in the ultrasound image. Whereas an overly large amount of water jetting or overly long time makes the water column generate a large number of reflections and a water flow movement environment within a closed environment of the human tissue, which may generate a large number of artifacts in the ultrasound image, and therefore the phenomenon of water column cannot be observed in the ultrasound image, either. In addition, the position of the cutter hole of the water jet cutter is obtained through the position of the water column, and the distance between the end of the water column and the cutter hole varies with the amount of water jetting. The above problems make it difficult for the operator to accurately obtain the positions and postures of the water jet cutter during manual operation. Manual operation also has the problems of tissue damage caused by water jetting for a long time and unbalanced amount of water in the tissue.

SUMMARY

The present application provides a water jet cutter trajectory presetting apparatus to solve the problems of manually determining a work trajectory of a water jet cutter having low accuracy and efficiency and easily causing damage.

An embodiment of the present application provides a water jet cutter trajectory presetting apparatus used for implementing a water jet cutter trajectory presetting method. The method includes the following steps:
  setting a telescoping direction of a water jet cutter and a telescoping direction of an ultrasonic probe in parallel;
  identifying a water jetting point in a sagittal ultrasound image, determining a first position of a cutter hole in the telescoping direction, controlling the ultrasonic probe to move to obtain a cross-sectional ultrasound image of the first position, and identifying the water jetting point and a direction of a water column in the cross-sectional ultrasound image;

controlling the water jet cutter to rotate until the water column points to the ultrasonic probe, and generating a water jet cutter trajectory start point at the position of the water jetting point on the ultrasound image; and determining a second position set in the telescoping direction of the water jet cutter as a water jet cutter trajectory end point, and generating on the sagittal ultrasound image a mark line from the start point to the end point.

The apparatus includes:

a water jet cutter adapter configured for telescoping motion of the water jet cutter; an ultrasonic adapter configured for telescoping motion of the ultrasonic probe;

a control unit configured to control water jetting of the water jet cutter and motion of the ultrasonic probe; and a determination unit configured to, based on a run result of an image recognition algorithm, determine the first position of the cutter hole in the telescoping direction, generate the water jet cutter trajectory start point at the position of the water jetting point on the ultrasound image, determine the second position set in the telescoping direction of the water jet cutter as the water jet cutter trajectory end point, and generate on the ultrasound image the mark line from the start point to the end point.

Preferably, a position relationship between coordinates of a sagittal image point and a cross section is calibrated in advance, and data of the position relationship between the coordinates of the sagittal image point and the cross section are determined. The controlling the ultrasonic probe to move to obtain a cross-sectional ultrasound image of the first position further includes:

in response to first position information on a sagittal plane, based on the data of the calibrated spatial position relationship, automatically controlling the ultrasonic probe to move along the telescoping direction to a cross section target position corresponding to the first position, the water jetting point of the cutter hole of the water jet cutter being presented in the cross-sectional ultrasound image.

Or preferably, a position relationship between coordinates of a cross-sectional image point and a sagittal plane is calibrated in advance, and data of the spatial position relationship between the coordinates of the cross-sectional image point and the sagittal plane are determined. The step of identifying a water jetting point in a sagittal ultrasound image, and determining a first position of a cutter hole in the telescoping direction further includes:

in response to first position information on a cross section, based on the data of the calibrated spatial position relationship, automatically controlling the ultrasonic probe to move along the telescoping direction to a sagittal target position corresponding to the first position, the ultrasonic probe being rotated, and the water jetting point of the cutter hole of the water jet cutter being presented in the sagittal ultrasound image.

Preferably, the determining a second position set in the telescoping trajectory of the water jet cutter as a water jet cutter trajectory end point further includes:

the second position may being a point of intersection of the water jet cutter and a boundary of the ultrasound image, i.e., a limiting position in the telescoping direction of the water jet cutter that can be seen in the ultrasound image; or identifying a tube end of an endoscope in the ultrasound image, and using coordinates of the tube end of the endoscope in the telescoping direction as the second position.

Preferably, it further includes the following step: obtaining image features of the water column of water jetting experimentally in advance, the image features including: a shape and length of the water column under a specific water pressure; and in the step of identifying the water jetting point, features of the water column are extracted through an image processing algorithm. Further, the shape of the water column and a position of the water jetting point are manually identified in an original ultrasound image to form a training dataset, and a water column recognition algorithm of the ultrasound image is obtained through a method of machine learning.

Preferably, prior to the steps of the foregoing method, it further includes the following step: in the ultrasound image, by taking a bonding part of the tube end of the endoscope and a rod portion of the water jet cutter as a feature point, or a point of intersection of the water jet cutter and a boundary of the ultrasound image as the feature point, identifying the second position of the water jet cutter in the ultrasound image through a method of image processing.

In any of the embodiments of the present application, preferably, the ultrasound image is Doppler imaging.

Preferably, prior to the steps of the foregoing method, a sampling position and size of a feature image for identifying the water jetting point is adjusted, and based on a correct rate of an image recognition algorithm or a recognition probability of a machining learning algorithm, an optimized sampling range of the feature image is determined.

In any of the embodiments of the present application, preferably, an amount of water jetting is automatically dynamically controlled, and water is pumped while water is jetted to maintain a balance of an amount of water in an external environment of the water jet cutter.

An embodiment of the present application further provides a computer-readable storage medium having a computer program stored thereon, where the program, when being executed by a processor, implements the method according to any of the embodiments of the present application.

An embodiment of the present application further provides an electronic device, comprising a memory, a processor, and a computer program that is stored on the memory and can be run in the processor, where the processor, when executing the computer program, implements the method according to any of the embodiments of the present application.

At least one technical solution adopted by the embodiments of the present application can achieve the following beneficial effects.

The present invention does not rely on an additional sensor or mark point (e.g., an optical or magnetic navigator), completes obtaining of positions and postures through a biplanar ultrasound image, achieves visualization of the water jet cutter on the ultrasound image, provides key information for automatic planning of an excision path of the water jet cutter, simplifies the manual operation process of an operator, and improves the efficiency.

BRIEF DESCRIPTION OF DRAWINGS

The accompanying drawings described herein are used to provide a further understanding of the present application, and form part of the present application. Exemplary embodiments of the present application and descriptions thereof are used to explain the present application, and do not constitute any inappropriate limitation to the present application. In the drawings.

DETAILED DESCRIPTION OF THE EMBODIMENTS

To make the objectives, technical solutions and advantages of the present application clearer, the following clearly and completely describes the technical solutions of the present application with reference to the specific embodiments of the present application and the corresponding accompanying drawings. Apparently, the described embodiments are merely some rather than all of the embodiments of the present application. All other embodiments obtained by a person of ordinary skill in the art based on the embodiments of the present application without creative efforts shall fall within the protection scope of the present application.

The technical solution provided by each embodiment of the present application will be described in detail below with reference to the accompanying drawings.

According to the present invention, based on biplanar ultrasounds, by automatically controlling and adjusting the position of a water jet cutter and release of an energy source, in combination with identification of a jetted water column by an ultrasound image, an accurate position of a cutter hole in the water jet cutter is obtained.

In a preferred embodiment of the present application, identification may further be performed by using an endoscope moving mechanism with position feedback designed on the water jet cutter, size information of the water jet cutter, and the end of an endoscope as feature points on the ultrasound image, to obtain an end position. By combining water jetting from the cutter hole of the water jet cutter and the structural design of the endoscope, feature points are formed in the ultrasound image to complete obtaining of positions and postures of a surgical instrument in a body lumen.

Figure 1:
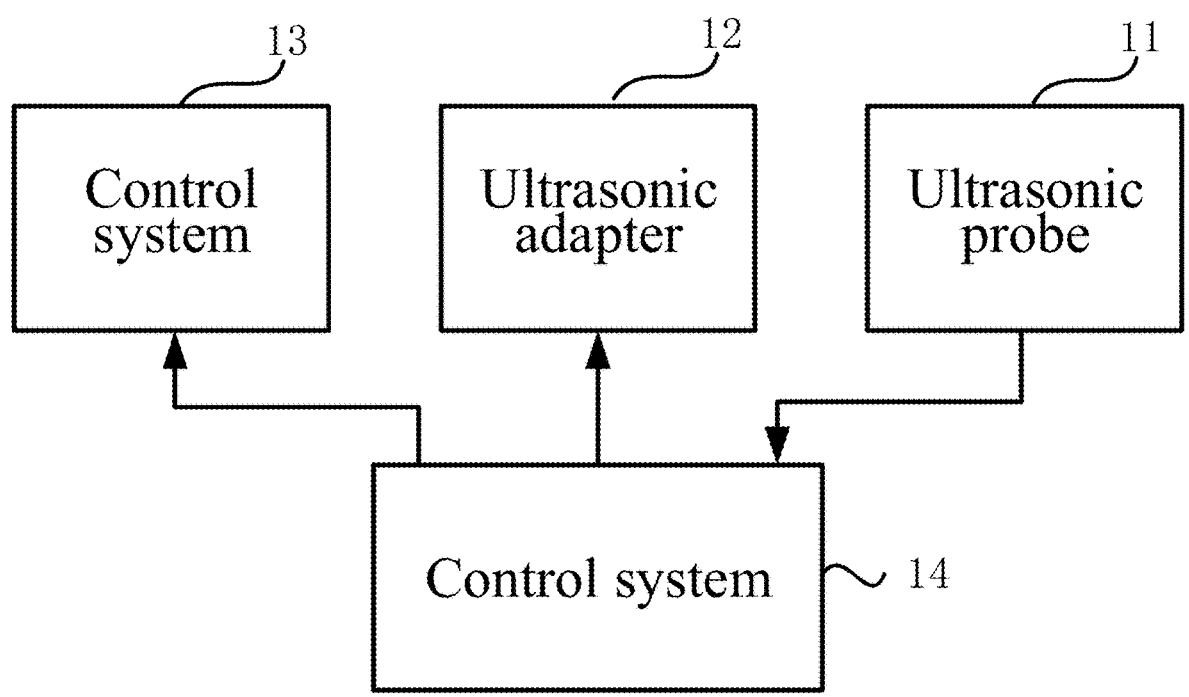
FIG. 1 is a schematic structural diagram of a system according to the present application.

FIG. 1 is a schematic structural diagram of a system according to the present application.

The system of the present application includes a biplanar ultrasonic probe system 11, an ultrasonic adapter 12, a water jet cutter module and adapter 13, and a control system 14 in the lumen. The biplanar ultrasonic system is configured to generate an ultrasonic video, which is signaled to the control system. The ultrasonic adapter is configured to fix the ultrasonic probe and provide at least two degrees of freedom of motion in linear and rotational directions for the probe, which may be a motion mechanism such as a mechanical arm. In the water jet cutter module and adapter, preferably, a water jet cutter module is of a water jet cutter body plus endoscope structure, i.e., a part integrally inserted into the lumen, and an adapter is a mechanism that provides a linear and rotational water jetting function of the water jet cutter and linear motion and position feedback of the endoscope, and also serve to fix the water jet cutter, which may be a motion mechanism such as a mechanical arm. The control system is configured to control the ultrasonic adapter, the water jet cutter module and adapter and the biplanar ultrasonic probe system to work.

Figure 2:
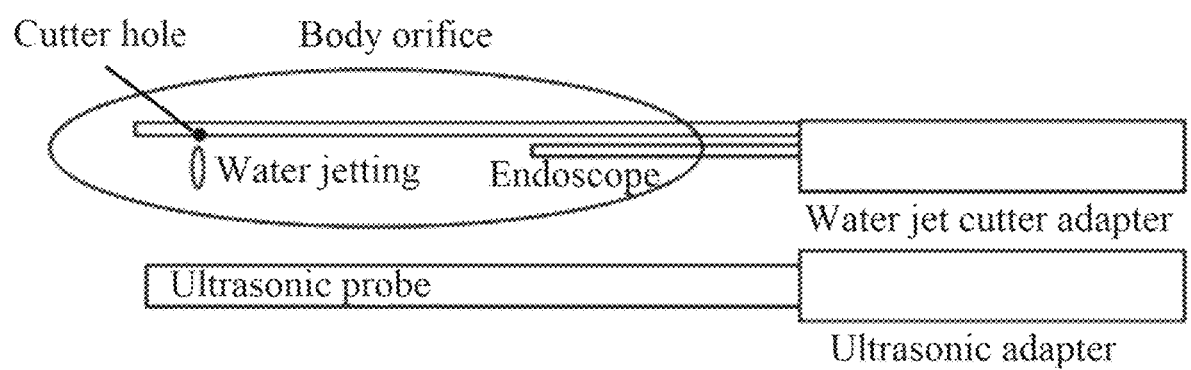
FIG. 2 is a schematic diagram of work positions of a water jet cutter and an ultrasonic probe according to the present application.

FIG. 2 is a schematic diagram of work positions of a water jet cutter and an ultrasonic probe according to the present application. A telescoping direction of the water jet cutter and a telescoping direction of the ultrasonic probe are set in parallel. An ultrasound image of the tissue between the water jet cutter and the ultrasonic probe, a video of the water jet cutter and a video of a water jetting state can be obtained through the ultrasonic probe.

Figure 3:
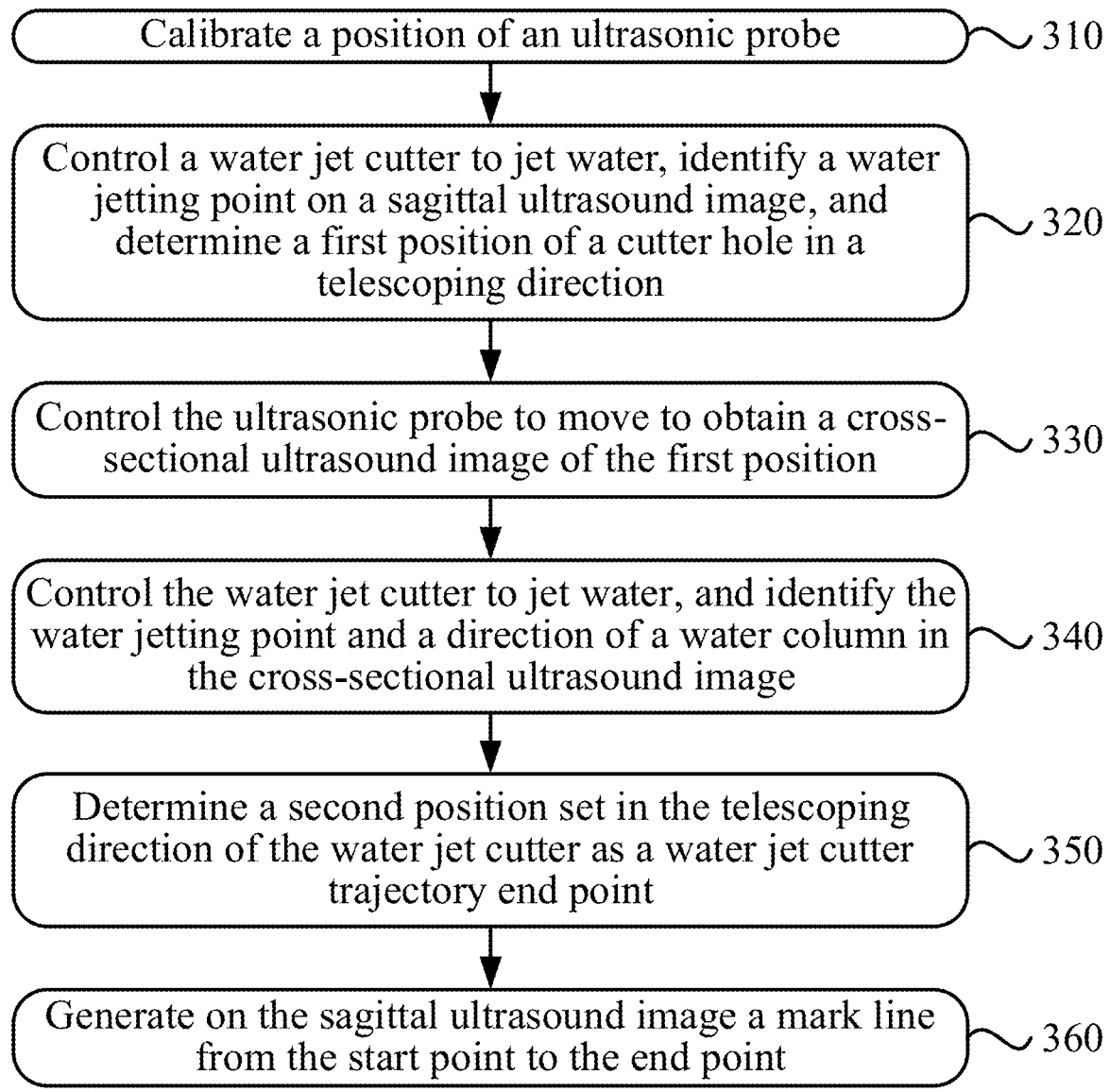
FIG. 3 is a flowchart of an embodiment of a water jet cutter trajectory presetting method according to the present application.

FIG. 3 is a flowchart of an embodiment of a water jet cutter trajectory presetting method according to the present application. An embodiment of the present application provides a water jet cutter trajectory presetting method, including the following steps:

Step 310, Calibrate a position of an ultrasonic probe.

In the step, a spatial position of a biplanar ultrasonic probe is calibrated, which is completed through cooperation of an ultrasonic adapter. In the step, it is also necessary to determine a position of any point on a cross-sectional ultrasound image corresponding to a position thereof on a sagittal ultrasound image when a target object at the point is simultaneously imaged on a sagittal plane and a cross section. Correspondingly, coordinates of the point on the cross-sectional ultrasound image corresponding to coordinates thereof on the sagittal ultrasound image are determined.

By calibrating and constructing a motion coordinate system of the biplanar ultrasonic probe based on the ultrasonic adapter before a surgery and a mapping relationship of spatial positions of a biplanar ultrasound image, e.g., the known point in the sagittal ultrasound image, a cross-sectional image of a certain position to which the biplanar ultrasonic probe moves corresponding to the ultrasonic adapter and pixel coordinates in the image may be obtained. With the help of the ultrasonic adapter, the ultrasonic probe may be controlled to accurately move to the position, thereby helping an operator to accurately build a position information relationship in a three-dimensional space during operation.

The operator sets the telescoping direction of the water jet cutter and the telescoping direction of the ultrasonic probe in parallel. A complete video of the water jet cutter is seen on the sagittal ultrasound image. After manual confirmation of an initial position, positions and postures of the water jet cutter are obtained according to the following process.

Figure 4:
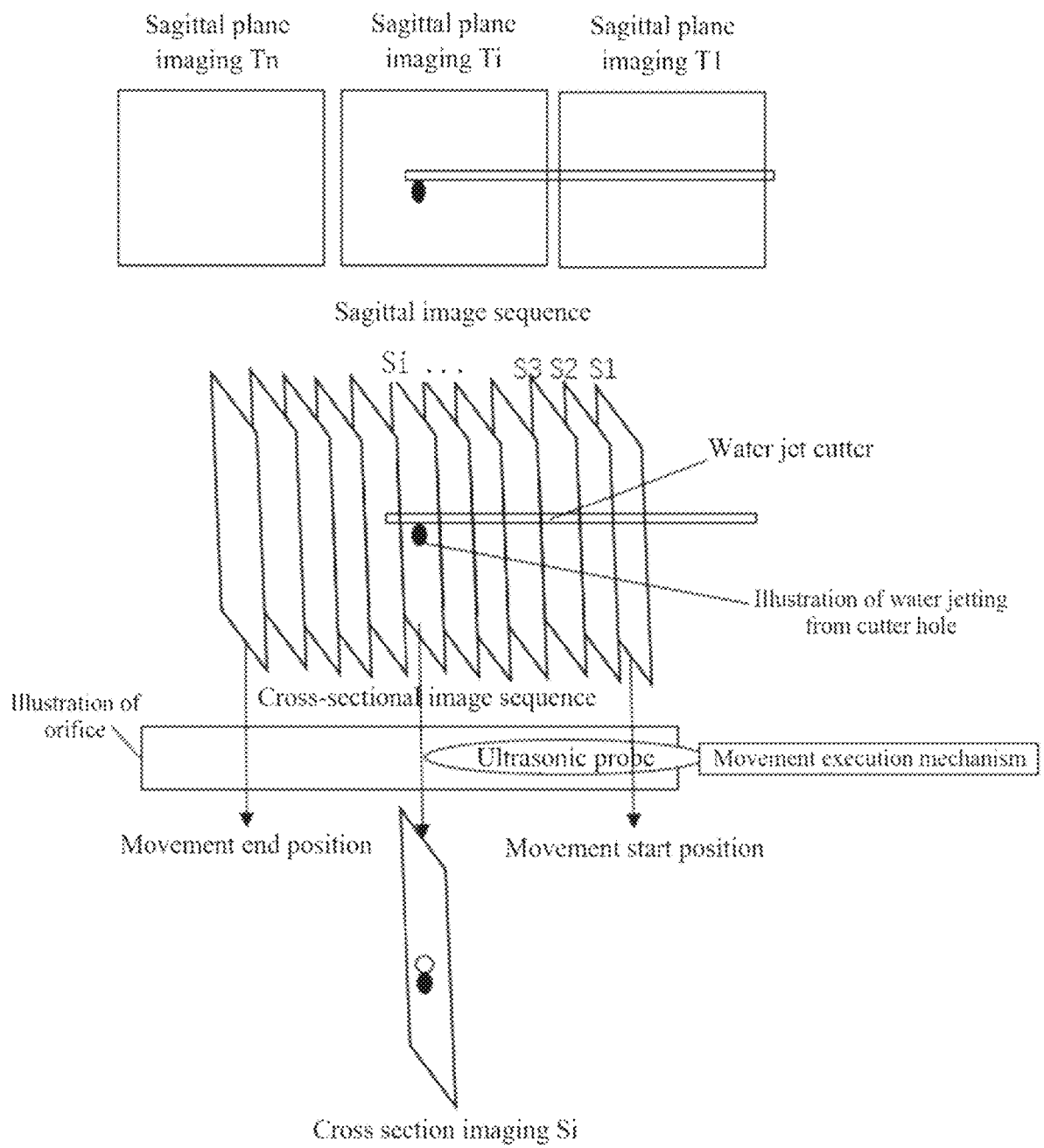
FIG. 4 is a schematic diagram of a position relationship between a cross section and a sagittal image point when the image point of a sagittal plane is presented in a cross-sectional image.

As shown in FIG. 4, cross-sectional images S1, S2 . . . . Si are a series of images at discrete positions. When a target object at any point is simultaneously imaged on a sagittal plane and a cross section, through calibration on a sagittal image and a cross-sectional image, a position of the point on the cross section corresponding to a position thereof on the sagittal image may be determined. Therefore, data of a position relationship between coordinates of the sagittal image point and the cross section are determined and stored. Or, a position of the point on the sagittal plane corresponding to a position thereof on the cross-sectional image is determined. Therefore, data of a position relationship between coordinates of the cross-sectional image point and the sagittal plane are determined and stored.

Step 320, Control the water jet cutter to jet water, identify a water jetting point on a sagittal ultrasound image, and determine a first position of a cutter hole in the telescoping direction.

When the positions and postures of the water jet cutter are automatically obtained, for the sake of safety, the operator is required to manually guide the water jet cutter and the ultrasonic probe to enter the human body. Meanwhile, initial positions of the water jet cutter and ultrasounds are adjusted, such that a video of the water jet cutter may be seen in the biplanar ultrasound image, and a water jetting image of the water jet cutter may be seen on the sagittal plane Preferably, a sagittal ultrasonic probe is rotated around an axis of the ultrasonic probe, such that the video of the water jet cutter is presented in the middle of the cross-sectional ultrasound image.

Figure 5:
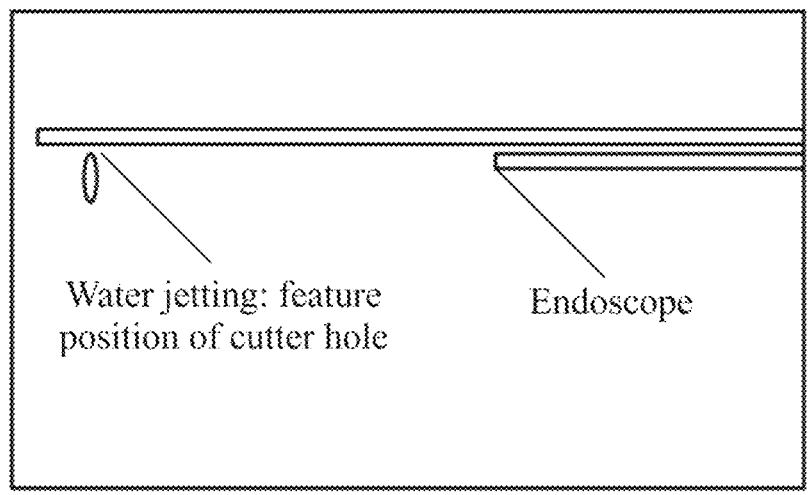
FIG. 5 is a schematic diagram of a position of the water jet cutter in a sagittal ultrasound image.

In an image where the water jet cutter is controlled to jet water in the sagittal ultrasound image, a water jetting region is identified as a feature point of a cutter hole through an image algorithm, and meanwhile, the position of the cutter hole is obtained, as shown in FIG. 5.

Figure 6:
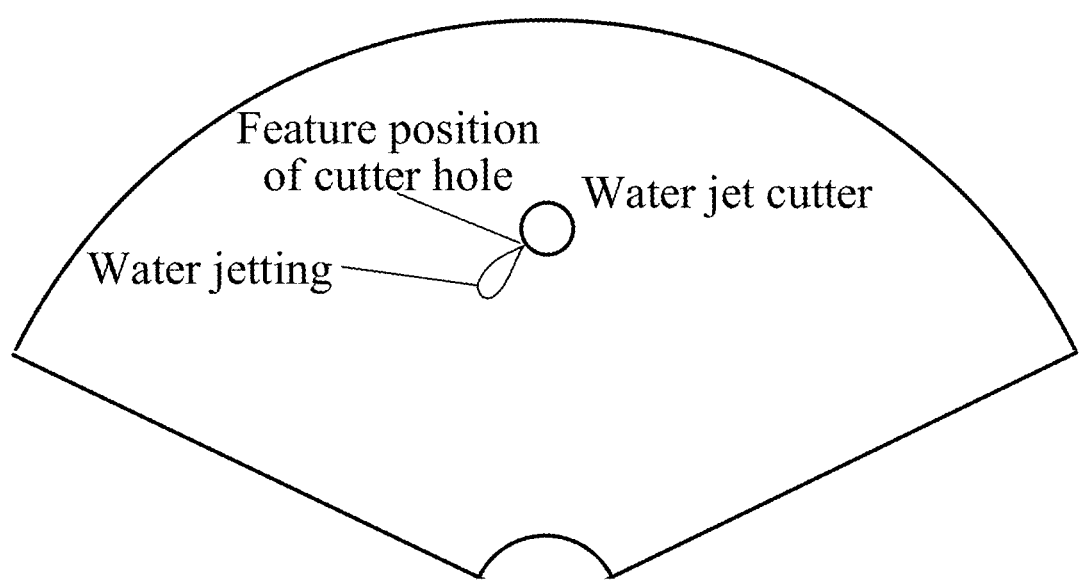
FIG. 6 is a schematic diagram of a position of the water jet cutter in a cross-sectional ultrasound image.

Step 330, Control the ultrasonic probe to move to obtain a sectional ultrasound image of the first position; and control the water jet cutter to jet water, and identify the water jetting point and a direction of a water column in the cross-sectional ultrasound image, as shown in FIG. 6.

It is to be noted that the present application does not limit the sequence of step 320 and step 330. For example, coordinates of the first position can be obtained by executing step 320 first and then executing step 330 or by executing step 330 first and then executing step 320. Within a range calibrated in step 310, whether the water jetting point is first searched in the sagittal plane or the cross section, the position of the other scan plane can be determined according to a calibrated position relationship.

For example, when step 320 is executed first and then step 330 is executed, according to the spatial position relationship of the biplanar ultrasonic probe calibrated in step 310, and based on the position of the cutter hole on the sagittal image obtained in step 320, corresponding coordinates of the cutter hole on the cross-sectional image are calculated, thereby obtaining a distance of the ultrasonic probe moving along the telescoping direction.

Preferably, in response to first position information on the sagittal plane, according to the calibrated spatial position relationship, and based on the position of the cutter hole on the sagittal plane, the corresponding coordinates of the cutter hole on the cross-sectional image are calculated, thereby obtaining the distance of the ultrasonic probe moving along the telescoping direction. Further, according to data of the calibrated spatial position relationship, the ultrasonic probe is automatically controlled to move along the telescoping direction to a sagittal target position corresponding to the first position. If the position of the cutter hole of the water cutter is presented within a range of the cross-sectional ultrasound image, the water jetting point of the cutter hole of the water jet cutter is presented in the cross-sectional ultrasound image.

For example, as shown in FIG. 4, when a coordinate position of water jetting from the cutter hole (black water jetting as illustrated in the figure) in a sagittal Ti image is determined during sagittal plane imaging, and according to a calibrated relationship between sagittal image coordinates and a cross section sequence, the ultrasonic probe may be controlled to directly move to a position of a cross section Si to obtain a real-time image of the cross section of the position of the cutter hole during sagittal plane imaging. When the cross-sectional ultrasound image is distributed in a sector shape with the probe as the center, it is also unnecessary to rotate a cross-sectional ultrasonic probe around the axis of the ultrasonic probe, such that the video of the water jet cutter is presented in the middle of the cross-sectional ultrasound image.

For another example, when step 330 is executed first and then step 320 is executed, according to the spatial position relationship of the biplanar ultrasonic probe calibrated in step 310, and based on the position of the cutter hole on the cross-sectional image obtained in step 330, a corresponding sagittal position of the cutter hole during sagittal plane imaging is calculated, thereby obtaining a distance of the ultrasonic probe moving along the telescoping direction and/or an angle of the probe rotating around the axis.

Preferably, in response to first position information on the cross section, according to the calibrated spatial position relationship, and based on the position of the cutter hole on the cross section, the corresponding coordinates of the cutter hole on the sagittal plane are calculated, thereby obtaining the distance of the ultrasonic probe moving along the telescoping direction and/or the angle of the probe rotating around the axis. Further, according to the data of the calibrated spatial position relationship, the ultrasonic probe is automatically controlled to move along the telescoping direction to a sagittal target position corresponding to the first position. The probe is rotated until the water jetting point of the cutter hole of the water jet cutter is presented in the sagittal ultrasound image.

For example, as shown in FIG. 4, when, according to the position of the cutter hole on a cross-sectional image Si and position information of the cross section in a cross section sequence, through a calibrated spatial position relationship between the cross section sequence and the sagittal plane, a coordinate position of the cutter hole in the image during sagittal plane imaging and the distance of the ultrasonic probe moving along the telescoping direction are calculated, the ultrasonic probe is controlled to directly move to a position of a sagittal plane Ti. The probe is rotated until the water jetting point of the cutter hole of the water jet cutter is presented in the sagittal ultrasound image.

Step 340, Control the water jet cutter to rotate until the water column points to the ultrasonic probe, determine a direction of a water jetting hole of the water jet cutter on the cross-sectional ultrasound image, and correspondingly, generate a water jet cutter trajectory start point at the position of the water jetting point on the sagittal ultrasound image.

Step 350, Determine a second position set in the telescoping direction of the water jet cutter as a water jet cutter trajectory end point.

Preferably, a tube end of an endoscope is identified in the ultrasound image, and coordinates of the tube end of the endoscope in the telescoping direction are used as the a set second position. For example, during work, the operator guides the water jet cutter adapter, observes an image of the endoscope, and pre-controls the endoscope to retreat to a water jet cutter running end position.

Step 360, Generate on the sagittal ultrasound image a mark line from the start point to the end point.

It is to be noted that two limit positions at which the water jet cutter may move may be determined on the sagittal plane, i.e., a start position of the cutter hole of the water jet cutter in the telescoping direction of the water jet cutter, an end point being a limit position at which the water jet cutter can move. A line of connecting the start point and the end point is a trajectory of a cutter body of the water jet cutter.

When the position of the sagittal plane moves along the telescoping direction, as shown in FIG. 4, according to simple coordinate transformation, positions of imaging points of the first position and the second position on a moving sagittal image may still be determined, and a line of connecting the first position and the second position is identified.

It is to be further noted that imaging may be performed on the sagittal plane only when the cutter hole of the water jet cutter is aligned to the ultrasonic probe and the water column jetted by the cutter hole is tangent to a sagittal probe imaging plane. The sagittal ultrasonic probe imaging plane has a certain width. The orientation of the cutter hole needs to be accurately calibrated on the cross section to make a cutter point directly face the ultrasonic probe. The jetted water column is aligned to the direction of the ultrasonic probe and is imaged as a conical water vapor mass on the sagittal plane. Meanwhile, the water jet cutter is adjusted on the cross section, such that imaging of the water jet cutter is centered.

It is further noted that a region where the water jet cutter acts is in a sector shape on the cross section. Sectors on different cross sections have different angles and radii, and the region is a superposition of a series of sector sections. On the sagittal plane, the different sector radii are superposed to form a closed region. Therefore, all information of a trajectory range related to the positions and postures of the water jet cutter may be shown on the sagittal plane, including a motion trajectory of the cutter hole of the water jet cutter and a range of depth of action of the water jet cutter generated along the motion trajectory.

Visualization is achieved in the step. Positions of the cutter hole in the sagittal plane and the cross section (or further including the position of the feature point of the endoscope) are obtained through the above steps, and then a ling of connecting a start point and an end point of the water jetting point may be drawn in the ultrasound image, thereby accomplishing enhancement of visualization of the water jet cutter in the ultrasound image, for use in subsequent steps such as surgical planning.

In the step of visualization of the water jet cutter, the cutter hole position and the end position of the water jet cutter are drawn on at least one sagittal ultrasound image to represent a fit line of the water jet cutter. The position of the water jet cutter and the direction of the cutter hole are drawn in the cross-sectional image. Preferably, in the foregoing embodiment, through the control system 14, the water jet cutter module and adapter and the ultrasonic adapter are controlled. Videos of the ultrasonic cross section and sagittal plane are acquired. Rotation and water jetting of the water jet cutter are automatically adjusted. The position of the water hole of the water jet cutter is judged through water jetting. Through identification of feature points or position feedback of the endoscope and the water jet cutter in the ultrasound image, the endoscope is used as a tail end of the water jet cutter. The direction of the cutter hole, i.e., a direction of releasing energy of the water jet cutter, is determined through the sagittal and cross-sectional images. A line of connecting the position of the cutter hole and the position of the tail end is used as a posture of the water jet cutter in the ultrasound image.

Automatic identification of the water column of water jetting and automatic control of the amount of water jetting avoid the operator from judging the position of the water column on the ultrasound image through water jetting for a long time during manual operation and from judging the position of the cutter hole through the position of the water column.

Preferably, in steps 320 and 330, according to the solution of the present application, when a sagittal water column image and a cross-sectional water column image are acquired, by controlling the water jet cutter to jet water in an instantaneous segment of image acquisition, the amount of water jetting is reduced, and the water flow intensity (or water pressure) is much lower than a surgical condition to avoid organ damage.

Dynamically controlling the amount of water jetting within a period of time of water jetting includes: automatic water jetting, where the control system identifies the water column of water jetting and a water environment in real time; when it is detected in an image that a large amount of water is jetted and a water flow movement scenario is produced, reducing the amount of water jetting or stopping water jetting; and when it is detected in the image that the water environment is stationary, allowing water jetting.

For example, in order to identify the water environment, when it is identified through an image algorithm that the water environment in the lumen is stationary, and a large amount of water is jetted and a water flow movement environment is produced, e.g., compared to the stationary environment, a large number of artifacts will be produced on an ultrasound image when water flow movement is produced, and a gray value in a region will be increased as a whole, which is judged by the change in gray value of a region nearby a water jet cutter in an adjacent picture, or by classifying water flow stationary and movement backgrounds through a classification network, or other means.

Further, in any of the embodiments of the present application, preferably, water is pumped while water is jetted to maintain a balance of an amount of water in an external environment of the water jet cutter. For example, while water is jetted in the lumen, it is necessary to pump water to maintain a balance of an amount of water in the lumen.

It is further noted that in steps 320 and 330, preferably, the water column images acquired in steps 320 and 330 are processed in real time through the image recognition algorithm. The solution of the present application avoids manual operation which is unable to quickly obtain a corresponding pixel relationship in sagittal and cross-sectional two-dimensional images and a position relationship of two ultrasonic probes, and repeated operation of water jetting and observation (e.g., manually switching to sagittal water jetting and rotating the water jet cutter, observing a water jetting phenomenon in an ultrasound image, and then switching to a cross-sectional image and manually jetting water while moving an ultrasonic probe until a water column can be observed in a cross-sectional image), which eliminates the defects of long time consumption in the manual visual inspection process and low accuracy in the way of observing the ultrasound image by the operator.

Preferably, prior to the steps of the foregoing method, it further includes the following step: obtaining image features of the water column of water jetting experimentally. The image features include: a shape and length of the water column under a specific water pressure. In the step of identifying the water jetting point, features of the water column are extracted through an image processing algorithm.

In addition, the lowest amount of water jetting and water pressure that satisfy the success rate of image recognition are selected through experiments to avoid other false damage.

For example, in order to identify the water column of water jetting, based on experiments, under a target environment, image features of the water column of water jetting are obtained, e.g., a triangular scattering shape of the water column under a specific water pressure, or cavitation of the water column to generate an elliptical air mass, and image features presented by the water column at different positions of the ultrasonic image are obtained, e.g., an image obtained by cutting the water column on a cross section and a sagittal plane. A vertex position of the water column is identified through an image algorithm such as object detection, segmentation, template matching, and key point detection, and an empirical value of the distance between the vertex and a cutter hole in a corresponding water column image is established through experiments. Then the position of the cutter hole is calculated. Since the position of the cutter hole is a point of intersection of the center line of the water column of water jetting and the line of the water jet cutter, the water column of water jetting may be manually and directly marked in an original image, the water hole may be manually and directly marked in the line of the water cutter, and a preset of the cutter hole of the water jet cutter may be obtained through deep learning training. The center line of the water column of water jetting is obtained, a straight line fitted by the water jet cutter is fitted, and a point of intersection of the center line and the straight line is a point of the cutter hole.

Further, the shape of the water column and a position of the water jetting point are manually identified in an original ultrasound image to form a training dataset, and a water column recognition algorithm of the ultrasound image is obtained through a method of machine learning.

Figure 7:
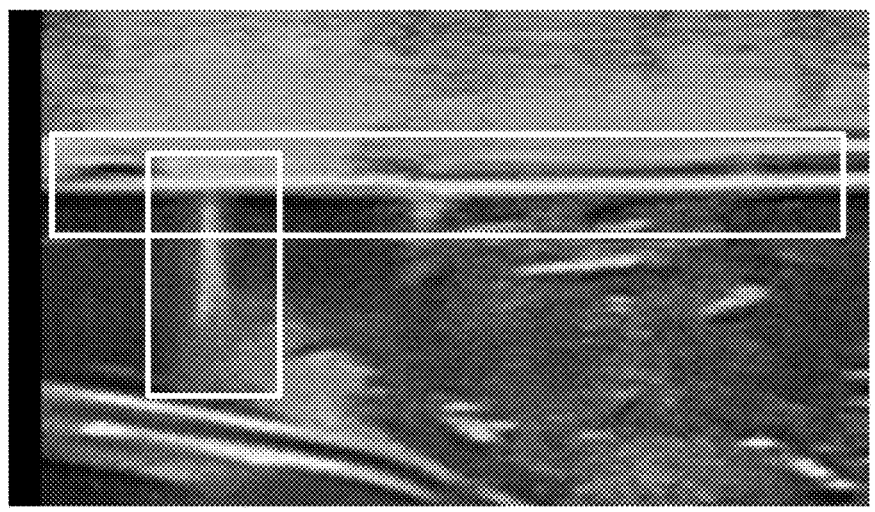
FIG. 7 is a schematic diagram of the water jet cutter in a die body in the sagittal ultrasound image.

FIG. 7 is a sagittal ultrasound image. As shown in the figure, a water jet cutter is in an upper block, a water column is in a lower block, and a broken line segment at the tail represents an endoscope. When no water is jetted, the position of a cutter hole cannot be found in the water jet cutter. When the water jet cutter is in a die body, due to various reasons such as tissue occlusion, poor quality of an ultrasound image, and artifacts, the water jet cutter in the ultrasound image may not be a clear straight line.

Figure 8:
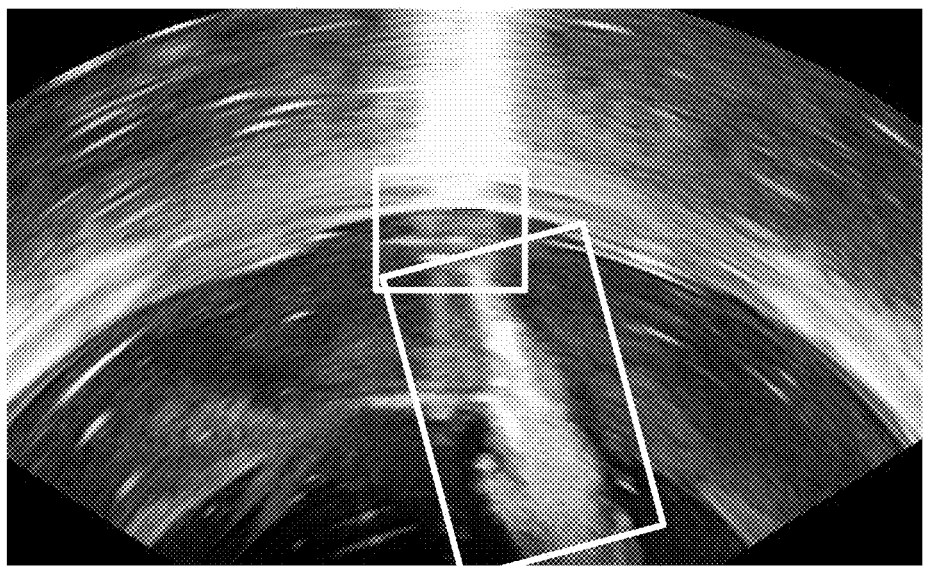
FIG. 8 is a schematic diagram of the water jet cutter in the die body in the cross-sectional ultrasound image.

FIG. 8 is a cross-sectional image. As shown in the figure, an image of a cutter head of the water jet cutter on a cross section is in an upper block, and a water column jetted from a cutter hole is in a lower block.

Prior to the steps of the foregoing method, a sampling position and size of a feature image for identifying the water jetting point is adjusted, and based on a correct rate of an image recognition algorithm or a recognition probability of a machining learning algorithm, an optimized sampling range of the feature image is determined.

Figure 9:
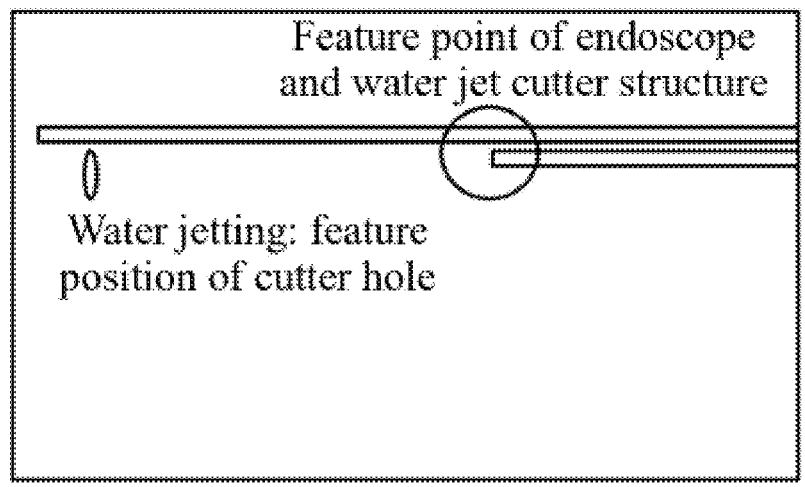
FIG. 9 is a schematic diagram of features of a bonding part of an endoscope and the water jet cutter structure.

FIG. 9 is a schematic diagram of features of a bonding part of an endoscope and the water jet cutter structure. Preferably, prior to the steps of the foregoing method, it further includes the following step: in the ultrasound image, by taking a bonding part of a tube end of the endoscope and a rod portion of the water jet cutter as a feature point, obtaining a position recognition algorithm of the tube end of the endoscope in the ultrasound image through an image processing or machine learning method. As shown in a circle in FIG. 9, in view of the poor quality of the ultrasound image and large noise, if the water jet cutter is directly identified in the ultrasound image, the stability is poor, and the water jet cutter is greatly affected by metal artifacts. Therefore, a structure in the circle is selected as a feature point in the image, and the feature point is marked and identified through image algorithms such as template matching, key point detection, or a deep learning key point recognition network to obtain the position of the endoscope as an end position of water jet cutter movement.

In particular, in the step of initial adjusting by the operator, e.g., adjusting the water jet cutter to a horizontal state (i.e., adjusting the water jet cutter to be parallel to the ultrasonic probe), the position of the endoscope may be accurately obtained by mechanical dimensions of the water jet cutter and position feedback of the endoscope.

Figure 10:
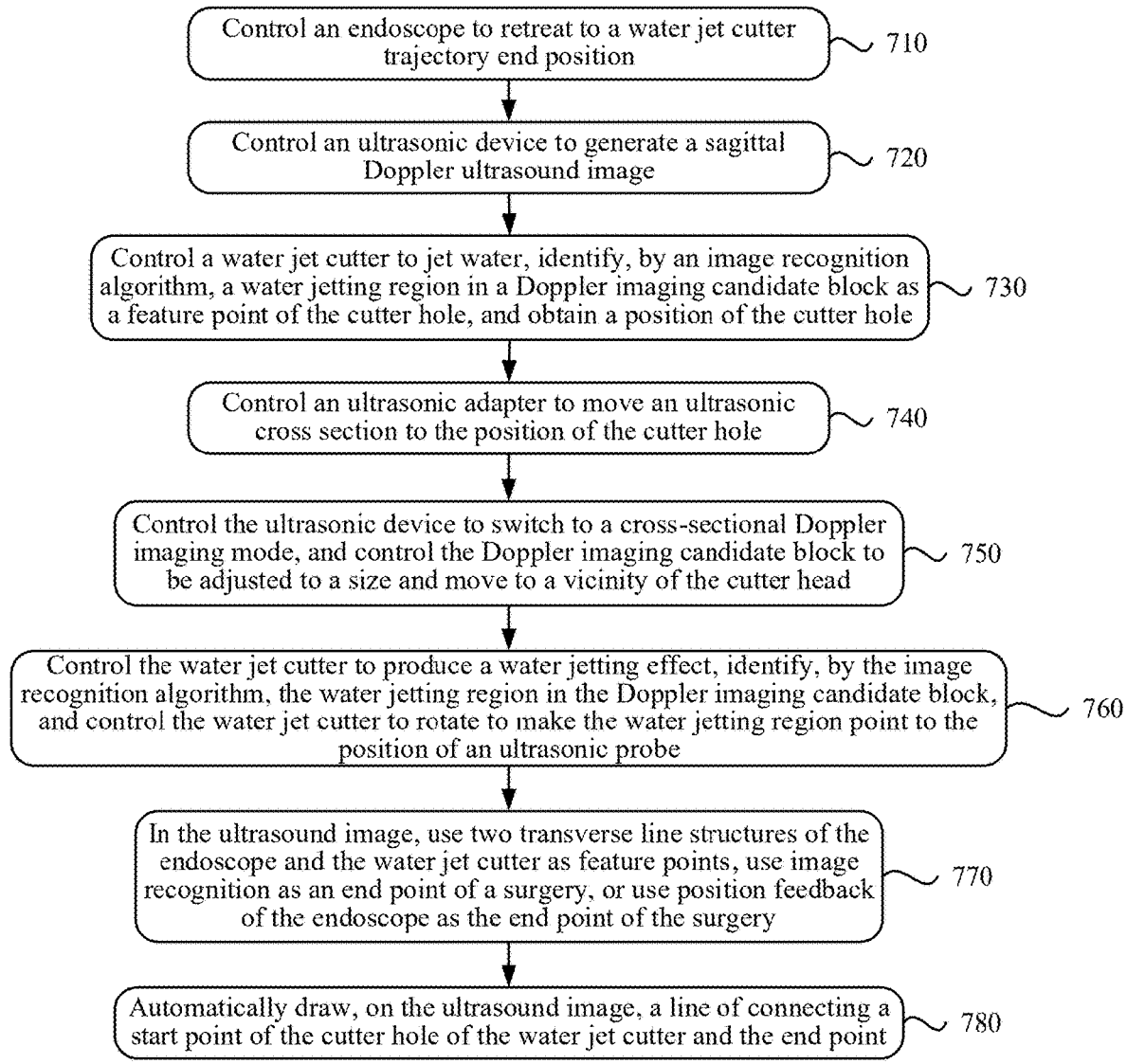
FIG. 10 is a flowchart of another embodiment of the water jet cutter trajectory presetting method according to the present application.

FIG. 10 is a flowchart of another embodiment of the water jet cutter trajectory presetting method according to the present application. In any of the embodiments of the present application, preferably, the ultrasound image is Doppler imaging. To further reduce the water pressure and water amount, all steps of water jetting in the foregoing method may also use an ultrasonic Doppler imaging mode. In the Doppler mode, a smaller amount of water jetting may be used or water in the water jet cutter flows out from the cutter hole under the influence of gravity to identify water jetting or the flowing water column, which may reduce water jetting in the lumen while also requiring water pumping to maintain a balance of the amount of water in the lumen, and may also avoid other false damage caused by water jetting.

Step 710, Observe an image of the endoscope and control the endoscope to retreat to a water jet cutter trajectory end position.

Step 720, Control an ultrasonic device to generate a sagittal Doppler ultrasound image. A Doppler imaging candidate block is controlled to be adjusted to an appropriate size and move to a vicinity of the cutter head.

A sampling position and size of a feature image for identifying the water jetting point is adjusted, and based on a correct rate of an image recognition algorithm or a recognition probability of a machining learning algorithm, an optimized sampling range of the feature image is determined, which is especially applicable to a Doppler ultrasound image. Empirical data may be obtained based on experiments, or an initial position or size of the Doppler imaging candidate block is obtained by identifying the position of the water jet cutter in the image or position feedback information of an external fixing mechanism.

Step 730, Control the water jet cutter to jet water, identify, by the image recognition algorithm, a water jetting region in the Doppler imaging candidate block as a feature point of the cutter hole, and obtain a first position of the cutter hole in a telescoping direction.

Step 740, Control an ultrasonic adapter to move an ultrasonic cross section to the first position where the cutter hole is located.

Step 750, Control the ultrasonic device to switch to a cross-sectional Doppler imaging mode, and control the Doppler imaging candidate block to be adjusted to an appropriate size and move to the vicinity of the cutter head.

Step 760, Control the water jet cutter to produce a water jetting effect, identify, by the image recognition algorithm, a water jetting region in the Doppler imaging candidate block, and control the water jet cutter to rotate to make the water jetting region point to the position of the ultrasonic probe.

Step 770, In the ultrasound image, use two transverse line structures of the endoscope and the water jet cutter as feature points, use image recognition as an end point of a surgery, or use position feedback of the endoscope as the end point of the surgery.

Step 780, Automatically draw, on a sagittal ultrasound image, a line of connecting a start point (the first position) of the cutter hole of the water jet cutter and the end point (the second position).

In the above process, the process of identifying the position of the cutter hole through water jetting is the same as the process of the foregoing method, which mainly introduces the ultrasonic Doppler mode and judges the position of the water column of water jetting through an image algorithm in the Doppler mode.

Determination of the size and initial position of the ultrasonic Doppler mode candidate block: on general ultrasonic instruments, the operator is required to manually draw the candidate block and adjust the size. Now, the empirical data may be obtained based on experiments, or the initial position or size of the candidate block is obtained by identifying the position of the water jet cutter in the image or the position feedback information of the external fixing mechanism, which increases the degree of automation.

In the Doppler mode, a fine water flow that flows out from the water hole under the influence of gravity may be imaged, which achieves the effects of reducing the amount of water jetting and the water pressure.

Figure 11:
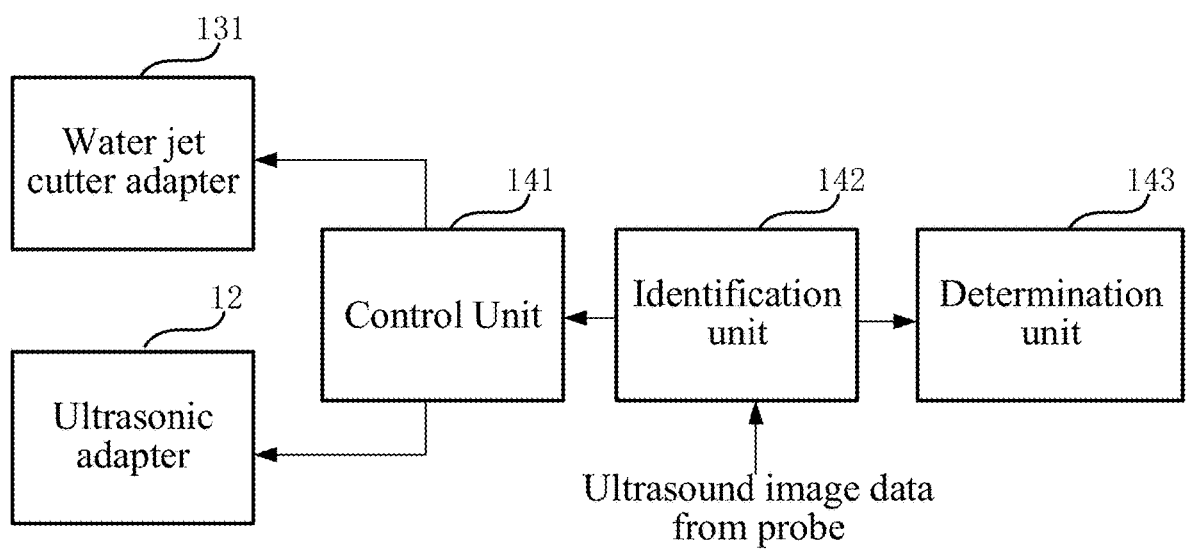
FIG. 11 is a structural diagram of an embodiment of a water jet cutter trajectory presetting apparatus according to the present application.

FIG. 11 is a structural diagram of an embodiment of a water jet cutter trajectory presetting apparatus according to the present application. An embodiment of the present application further provides a water jet cutter trajectory presetting apparatus used for implementing the method according to any of the embodiments of the present application. The water jet cutter trajectory presetting apparatus includes a control system 14.

A control unit 141 is configured to control the water jet cutter to jet water; control the ultrasonic probe to move, for example, including moving in the telescoping direction, or rotating around its own axis; and especially, control a water jet cutter module and adapter and an ultrasonic adapter, acquire videos of an ultrasonic cross section and sagittal plane, and automatically adjust rotation and water jetting of the water jet cutter. According to environmental water flow enabling, the function of water jetting of the water jet cutter is prohibited.

Specifically, the control unit is configured to calculate motion parameters of the ultrasonic adapter according to a coordinate relationship obtained from image calibration and control the ultrasonic adapter to move. For example, the control unit, in response to first position information on the sagittal plane, according to the calibrated spatial position relationship, and based on the position of the cutter hole on the sagittal image, calculates corresponding cross-sectional position coordinates of the cutter hole during cross section imaging, thereby obtaining a distance of the ultrasonic probe moving along the telescoping direction. Further, according to the data of the calibrated spatial position relationship, the ultrasonic probe is automatically controlled to move along the telescoping direction to a sagittal target position corresponding to the first position. The water jetting point of the cutter hole of the water jet cutter is presented in the sagittal ultrasound image. Or, based on the position of the cutter hole on the cross-sectional image, a corresponding sagittal position of the cutter hole during sagittal plane imaging is calculated, thereby obtaining a distance of the ultrasonic probe moving along the telescoping direction and/or an angle of the probe rotating around the axis. Further, according to the data of the calibrated spatial position relationship, the ultrasonic probe is automatically controlled to move along the telescoping direction to a sagittal target position corresponding to the first position. The probe is rotated until the water jetting point of the cutter hole of the water jet cutter is presented in the sagittal ultrasound image.

Specifically, the control unit is configured to synchronously control the water jet cutter to jet water within an instantaneous segment of image acquisition when a sagittal water column image and a cross-sectional water column are acquired; and further configured to dynamically control the amount of water jetting within a period of time of water jetting, which includes: automatic water jetting; when it is detected in an image that a large amount of water is jetted and a water flow movement scenario is produced, reducing the amount of water jetting or stopping water jetting; and when it is detected in the image that the water environment is stationary, allowing water jetting.

An identification unit 142 is configured to run the image recognition algorithm to identify the water column of water jetting and the water environment in real time; identify the water jetting point in the sagittal ultrasound image, identify the water jetting point and the direction of the water column in the cross-sectional ultrasound image, identify the end of the endoscope in the sagittal or cross-sectional ultrasound image, and identify environmental water flow stationary and moving backgrounds.

A determination unit 143 is configured to, according to a run result of the image recognition algorithm, determine the first position of the cutter hole in the telescoping direction, generate the water jet cutter trajectory start point at the position of the water jetting point on the ultrasound image, determine the second position set in the telescoping direction of the water jet cutter as the water jet cutter trajectory end point, and generate on the ultrasound image the mark line from the start point to the end point.

Further, the water jet cutter trajectory presetting apparatus includes a water jet cutter adapter 131 configured for telescoping motion of the water jet cutter; and further configured for telescoping motion of the endoscope; and an ultrasonic adapter 12 configured for telescoping motion of the ultrasonic probe. The ultrasonic probe is configured to acquire data of any sagittal image or cross-sectional image according to the present application, for example, including a sagittal image including the first position or the second position, or a cross-sectional image including the first position or the second position.

Those skilled in the art should understand that the embodiments of the present invention may be provided as a method, a system, or a computer program product. Therefore, the present application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer-usable program code.

Therefore, the present application further provides a computer-readable storage medium, having a computer program stored thereon. The program, when executed by a processor, implements the method according to any of the embodiments of the present application.

The present invention is described with reference to flowcharts and/or block diagrams of the method, the device (system), and the computer program product according to the embodiments of the present invention. It should be understood that computer program instructions can implement each procedure and/or block in the flowcharts and/or block diagrams and a combination of procedures and/or blocks in the flowcharts and/or block diagrams. These computer program instructions may be provided to a general-purpose computer, a special-purpose computer, an embedded processor, or a processor of another programmable data processing device to generate a machine, so that an apparatus configured to implement functions specified in one or more procedures in the flowcharts and/or one or more blocks in the block diagrams is generated by using instructions executed by the computer or the processor of another programmable data processing device.

These computer program instructions may alternatively be stored in a computer-readable memory that can instruct a computer or another programmable data processing device to operate in a specific manner, so that the instructions stored in the computer-readable memory generate an artifact that includes an instruction apparatus. The instruction apparatus implements a specific function in one or more procedures in the flowcharts and/or in one or more blocks in the block diagrams.

These computer program instructions may further be loaded onto a computer or another programmable data processing device, so that a series of operations and steps are performed on the computer or other programmable device, thereby generating computer-implemented processing. Therefore, the instructions executed on the computer or other programmable device provide steps for implementing a specific function in one or more procedures in the flowcharts and/or in one or more blocks in the block diagrams.

The present application further provides an electronic device (or a computing device), comprising a memory, a processor, and a computer program that is stored on the memory and may be run in the processor, the processor, when executing the computer program, implementing the method according to any of the embodiments of the present application.

In a typical configuration, a computing device includes one or more processors (CPU), input/output user interfaces, network interfaces and memories. Each memory may include forms of a non-permanent memory, a random access memory (RAM), and/or a non-volatile memory, etc. in the computer-readable medium, such as a read-only memory (ROM) or a flash RAM. The memory is an example of the computer-readable medium.

It is further noted that the terms "comprise", "include" and any other variants thereof are intended to cover non-exclusive inclusion, so that a process, a method, a commodity or a device that includes a series of elements not only includes these very elements, but may further include other elements not expressly listed, or further include elements inherent to this process, method, commodity or device. In the absence of more limitations, an element defined by "include a . . . " does not exclude other same elements existing in the process, method, commodity or device including the element.

The above is only an embodiment of the present application and is not intended to limit the present application. For those skilled in the art, the present application may have various modifications and changes. Any modifications, equivalent substitutions, improvements and the like made within the spirit and principle of the present application should be included within the scope of the claims of the present application.

What is claimed is:

1. A water jet cutter trajectory presetting apparatus used for implementing a-water jet cutter trajectory presetting method, the method comprising: setting a telescoping direction of a water jet cutter and a telescoping direction of an ultrasonic probe in parallel; identifying a water jetting point in a sagittal ultrasound image, determining a first position of a cutter hole in the telescoping direction, controlling the ultrasonic probe to move to obtain a cross-sectional ultrasound image of the first position, and identifying the water jetting point and a direction of a water column in the cross-sectional ultrasound image; controlling the water jet cutter to rotate until the water column points to the ultrasonic probe, and generating a water jet cutter trajectory start point at the position of the water jetting point on the ultrasound image; determining a second position set in the telescoping direction of the water jet cutter as a water jet cutter trajectory end point, and generating on the sagittal ultrasound image a mark line from the start point to the end point.

2. The water jet cutter trajectory presetting method according to claim 1, characterized in that
the method being used for implementing the determining a second position set in the telescoping direction of the water jet cutter as a water jet cutter trajectory end point further comprises:
identifying a tube end of an endoscope in the ultrasound image, and using coordinates of the tube end of the endoscope in the telescoping direction as the second position.

3. The water jet cutter trajectory presetting method according to claim 1, characterized in that
the method is used for implementing obtaining image features of the water column of water jetting experimentally in advance, the image features comprising: a shape and length of the water column under a specific water pressure; and
in the step of identifying the water jetting point, features of the water column are extracted through an image processing algorithm.

4. The water jet cutter trajectory presetting method according to claim 3, characterized in that
the method is used for implementing manually identifying the shape of the water column and a position of the water jetting point in an original ultrasound image to form a training dataset, and obtaining a water column recognition algorithm of the ultrasound image through a method of machine learning.

5. The water jet cutter trajectory presetting method according to claim 2, characterized in that
the method being used for implementing the determining a second position set in the telescoping direction of the water jet cutter as a water jet cutter trajectory end point further comprises the following step:
in the ultrasound image, by taking a bonding part of the tube end of the endoscope and a rod portion of the water jet cutter as a feature point, or taking a point of intersection of the water jet cutter and a boundary of the ultrasound image as the feature point, identifying the second position of the water jet cutter in the ultrasound image through a method of image processing.

6. The water jet cutter trajectory presetting method according to claim 1, characterized in that
the method is used for implementing the ultrasound image being Doppler imaging.

7. The water jet cutter trajectory presetting method according to claim 1, characterized in that
the method is used for implementing performing automatic dynamic control on an amount of water jetting to reduce the amount of water jetting in a presetting process of a water jet cutter trajectory.

8. The water jet cutter trajectory presetting method according to claim 1, characterized in that
the method is used for implementing calibrating a position relationship between coordinates of a sagittal image point and a cross section in advance, and determining data of the spatial position relationship between the coordinates of the sagittal image point and the cross section; and the controlling the ultrasonic probe to move to obtain a cross-sectional ultrasound image of the first position further comprises:
in response to first position information on a sagittal plane, based on the data of the calibrated spatial position relationship, automatically controlling the ultrasonic probe to move along the telescoping direction to a cross section target position corresponding to the first position, the water jetting point of the cutter hole of the water jet cutter being presented in the cross-sectional ultrasound image.

9. The water jet cutter trajectory presetting method according to claim 1, characterized in that
the method is used for implementing calibrating a position relationship between coordinates of a cross-sectional image point and a sagittal plane in advance, and determining data of the spatial position relationship between the coordinates of the cross-sectional image point and the sagittal plane; and the identifying a water jetting point in a sagittal ultrasound image, and determining a first position of a cutter hole in the telescoping direction further comprises:
in response to first position information on a cross section, based on the data of the calibrated spatial position relationship, automatically controlling the ultrasonic probe to move along the telescoping direction to a sagittal target position corresponding to the first position, the ultrasonic probe being rotated, and the water jetting point of the cutter hole of the water jet cutter being presented in the sagittal ultrasound image.

10. The water jet cutter trajectory presetting method according to claim 1, characterized in that
the method is used for implementing adjusting a sampling position and size of a feature image for identifying the water jetting point, and determining an optimized sampling range of the feature image.

11. The water jet cutter trajectory presetting method according to claim 6, characterized in that
the method is used for implementing adjusting a sampling position and size of a feature image for identifying the water jetting point, and determining an optimized sampling range of the feature image.

12. A non-transitory computer-readable recording storage medium having a computer program stored thereon, characterized in that
the program, when being executed by a processor, implements a water jet cutter trajectory presetting method, and the method comprises the following steps:
setting a telescoping direction of a water jet cutter and a telescoping direction of an ultrasonic probe in parallel;
identifying a water jetting point in a sagittal ultrasound image, determining a first position of a cutter hole in the telescoping direction, controlling the ultrasonic probe to move to obtain a cross-sectional ultrasound image of the first position, and identifying the water jetting point and a direction of a water column in the cross-sectional ultrasound image;
controlling the water jet cutter to rotate until the water column points to the ultrasonic probe, and generating a water jet cutter trajectory start point at the position of the water jetting point on the ultrasound image; and
determining a second position set in the telescoping direction of the water jet cutter as a water jet cutter trajectory end point, and generating on the sagittal ultrasound image a mark line from the start point to the end point.

13. An electronic device, comprising a memory, a processor, and a computer program that is stored on the memory and can be run in the processor, characterized in that the processor, when executing the computer program, implements a water jet cutter trajectory presetting method, the method comprising the following steps:
setting a telescoping direction of a water jet cutter and a telescoping direction of an ultrasonic probe in parallel;
identifying a water jetting point in a sagittal ultrasound image, determining a first position of a cutter hole in the telescoping direction, controlling the ultrasonic probe to move to obtain a cross-sectional ultrasound image of the first position, and identifying the water jetting point and a direction of a water column in the cross-sectional ultrasound image;
controlling the water jet cutter to rotate until the water column points to the ultrasonic probe, and generating a water jet cutter trajectory start point at the position of the water jetting point on the ultrasound image; and
determining a second position set in the telescoping direction of the water jet cutter as a water jet cutter trajectory end point, and generating on the sagittal ultrasound image a mark line from the start point to the end point.

* * * * *